United States Patent [19]
Yasukuni

[11] Patent Number: 4,518,229
[45] Date of Patent: May 21, 1985

[54] TELEPHOTO LENS SYSTEM

[75] Inventor: Mitsuo Yasukuni, Sennan, Japan

[73] Assignee: Minolta Camera Kabushiki Kaisha, Osaka, Japan

[21] Appl. No.: 365,268

[22] Filed: Apr. 5, 1982

[30] Foreign Application Priority Data

Apr. 6, 1981 [JP] Japan .................. 56-52120

[51] Int. Cl.³ .................. G02B 9/64; G02B 13/02
[52] U.S. Cl. .................. 350/454
[58] Field of Search .................. 350/454–456, 350/457

[56] References Cited
U.S. PATENT DOCUMENTS

| 4,204,747 | 5/1980 | Imai | 350/455 |
| 4,240,703 | 12/1980 | Momiyama | 350/454 |
| 4,359,272 | 11/1982 | Kreitzer | 350/455 |
| 4,437,734 | 3/1984 | Iizuka | 350/454 |

FOREIGN PATENT DOCUMENTS

| 54-046038 | 4/1979 | Japan . |
| 55-147606 | 11/1980 | Japan ........................ 350/454 |

Primary Examiner—John K. Corbin
Assistant Examiner—Scott J. Sugarman
Attorney, Agent, or Firm—Jackson, Jones & Price

[57] ABSTRACT

A telephoto lens system comprising a front lens group of a positive refractive power fixed on the optical axis and a rear lens group of a negative refractive power is provided. The rear lens group consists, from the object to the image side, of a first positive subunit fixed on the optical axis, a second negative subunit movable along the optical axis and a third positive subunit fixed on the optical axis, the second negative subunit being movable toward the image side for focusing to a closer object. The object side end surface of the first positive subunit is concave and fulfills the following condition in relation with the front lens group:

$$0.6 < |\phi'_{II-1}|/\phi_I < 2.5$$

20 Claims, 56 Drawing Figures

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

FIG.7
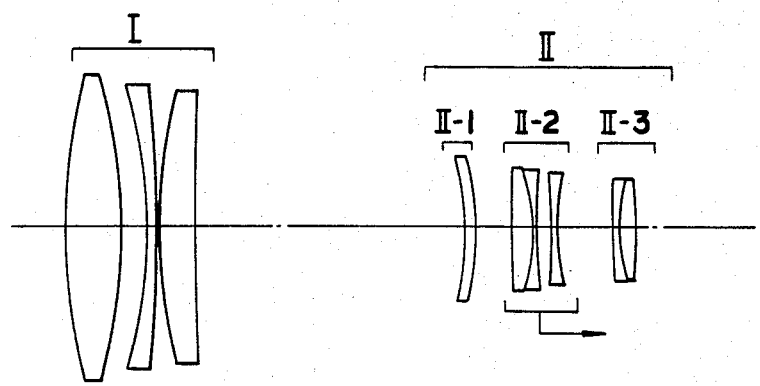
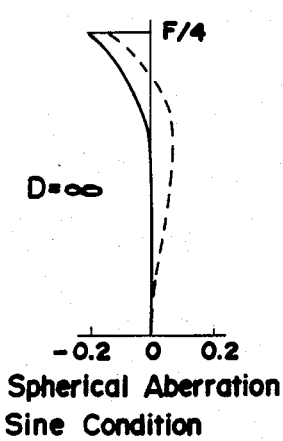
FIG.8a
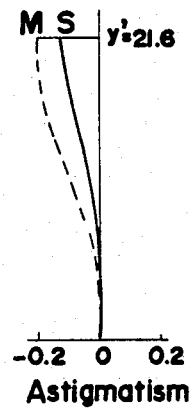
FIG.8b
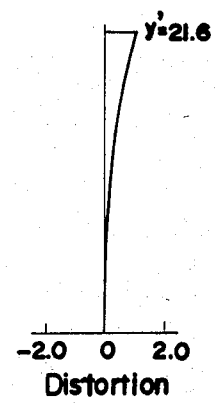
FIG.8c
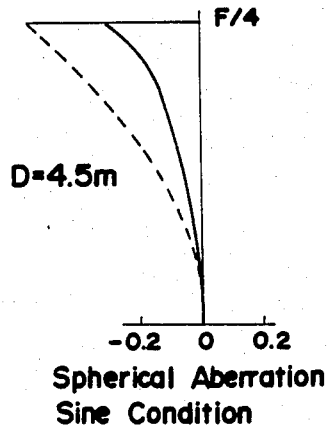
FIG.9a
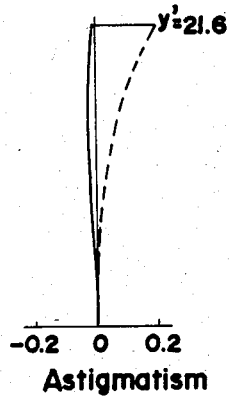
FIG.9b
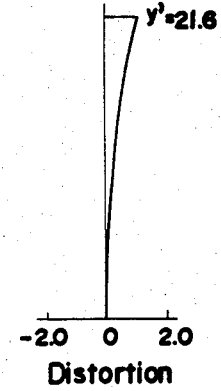
FIG.9c Spherical Aberration
Sine Condition Astigmatism Distortion Spherical Aberration
Sine Condition Astigmatism Distortion Spherical Aberration
Sine Condition Astigmatism Distortion Spherical Aberration
Sine Condition Astigmatism Distortion Spherical Aberration
Sine Condition Astigmatism Distortion Spherical Aberration
Sine Condition Astigmatism Distortion Spherical Aberration
Sine Condition Astigmatism Distortion Spherical Aberration
Sine Condition Astigmatism Distortion

TELEPHOTO LENS SYSTEM

BACKGROUND OF THE INVENTION

1. Field of the Invention

The present invention relates to telephoto optical lens systems and more particularly to an improved focusing mode of operation.

2. Description of the Prior Art

In the general field of photographic lens systems, focusing has been frequently accomplished by the movement of the entire lens element assembly. This is sometimes a relatively easy expedient for focusing in smaller compact lens assemblies of a fixed focal length.

However, in a telephoto lens assembly, its diameter, overall length and weight are by necessity increased over both a standard and wide angle lens systems. Accordingly, any focusing arrangement which requires the movement of the entire telephoto lens system would also require mechanisms that are by necessity relatively complex, strong and durable. Additionally, the moving distance for focusing is also necessarily increased. Needless to say these requirements all contribute to a higher cost for the lens barrel and produce both increased weight and size.

Modern photographic demands have required more compact and lighter telephoto lens systems. As any photographer knows, the relative weight of a telephoto lens system makes this system extremely hard to be held stable and adds human physiological vibrations that are introduced into the image plane of the camera.

Optical designers, when working with a telephoto lens assembly design have attempted to simplify focusing by moving a rear lens component. These rear lens components are generally relatively small in diameter and of light weight, especially compared with the more conventional systems wherein the entire lens assembly are moved as a unit. By utilizing this design approach, a movable rear lens component in a telephoto lens system generally has the advantage of a reduced lens movement, less barrel manufacturing cost and greater ease of operation. This design approach, however, suffers a disadvantage in that a variation in aberrations, due to movement of this rear lens component, are greater than in the conventional system. Particularly, in a relatively high speed telephoto lens system, the variation in aberrations caused by close focusing by means of moving the rear lens component are serious, and the bulkiness of the whole lens system is apt to be increased.

Typical examples of such focusing systems are described in U.S. Pat. No. 4,240,703 and in the following Japanese Patent applications that have been laid open to inspection to the public, Japanese Patent Application Laid Open No. 46038/1979 and Japanese Patent Application Laid Open No. 147606/1980.

Thus, there is still a demand in the prior art to provide an improved mode of focusing in telephoto lens assemblies.

SUMMARY OF THE INVENTION

An object of the invention is to provide an improved telephoto lens system of a type in which the focusing is practiced by means of moving a lens component located in the rear part of the lens system.

Another object of the present invention is to provide the above type of telephoto lens system with a relatively high speed.

Still another object of the present invention is to provide the above type of telephoto lens system in which the variation in aberrations caused by the focusing is minimized.

Further object of the present invention is to provide the above type of telephoto lens system with a relatively compact size.

According to a feature of the present invention, the telephoto lens system comprises a front lens group of a positive refractive power fixed on the optical axis; and a rear lens group of a negative refractive power consisting, from the object to the image side, of a first positive subunit fixed on the optical axis, a second negative subunit movable along the optical axis and a third positive subunit fixed on the optical axis, the second negative subunit being movable toward the image side for focusing to a close object, wherein the object side end surface of the first positive subunit is concave.

According to another feature of the present invention the lens system fulfills the following conditions:

$$0.6 < |\phi'_{II-1}|/\phi_I < 2.5,$$

$$0.25f < F_{II-3} < 0.65f,$$

$$0.31 < \phi''_{II-3}/|\phi_{II-2}| < 0.68,$$

$$|F_{I;II-1;II-2}| > 2.5f, \text{ and}$$

$$0.4 < D/F_I < 0.7.$$

The above symbols are defined in the description of the preferred embodiments herein.

The features of the present invention which are believed to be novel are set forth in particularity in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 7 shows a cross-sectional schematic view of a third embodiment of the present invention as Example 3;

FIGS. 8a, 8b and 8c disclose respectively the spherical aberration, astigmatism and distortion when the third embodiment is focused at infinity;

FIGS. 9a, 9b and 9c disclose respectively the spherical aberration, astigmatism and distortion when the third embodiment is focused at a distance, 4.5 m;

BRIEF DESCRIPTION OF THE PREFERRED EMBODIMENTS

The following description is provided to enable any person skilled in the optical design field to make and use the invention and sets forth the modes contemplated by the inventor of carrying out his invention. Various modifications, however, will remain readily apparent to those skilled in the art, since generic principles of the present invention are defined herein specifically to provide a telephoto lens system that can be manufactured in a relatively economical manner. Derivation of the formulae and their relation set forth herein can be accomplished with the assistance of a computer. The present invention represents the parameters of a compromised balance of accepted aberrations in a relatively easy manufactured and low cost telephoto lens system for utilization, for example, with a camera.

In the accompanying drawings which are further supplemented by the enclosed tables, the lenses in accordance with the present invention, are illustrated diagrammatically with light being assumed to travel from left to right.

Figure 1:
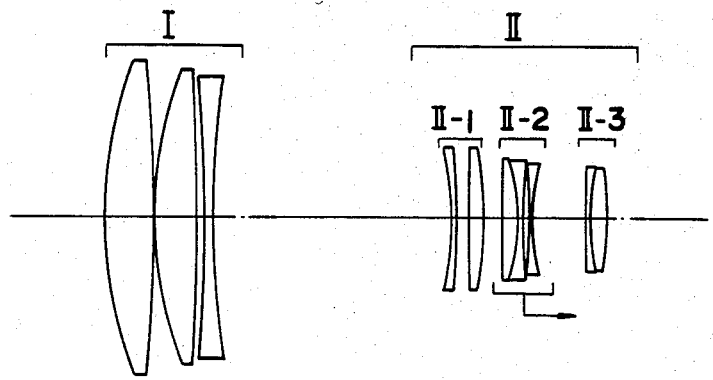
FIG. 1 is a cross-sectional schematic view disclosing a first embodiment as Example 1.
Figure 4:
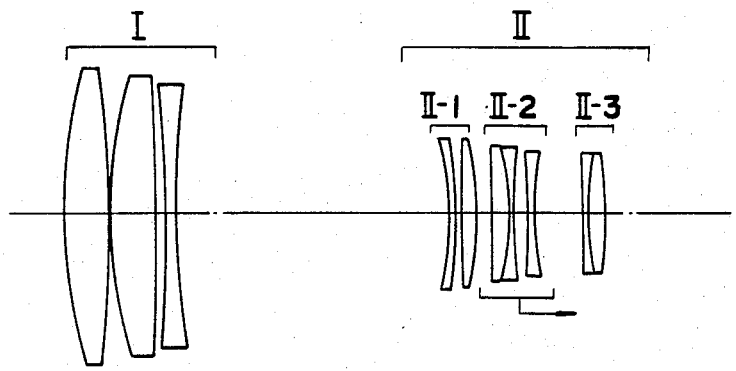
FIG. 4 is a cross-sectional schematic view of a second embodiment of the present invention as Example 2.
Figure 10:
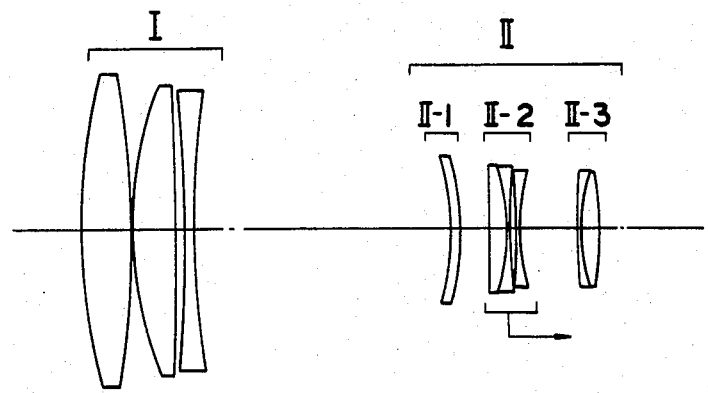
FIG. 10 is a cross-sectional schematic view disclosing a fourth embodiment as Example 4.
Figure 13:
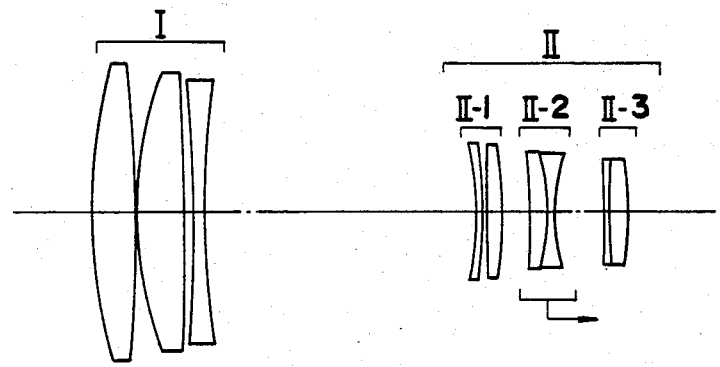
FIG. 13 is a cross-sectional schematic view of a fifth embodiment of the present invention as Example 5.
Figure 16:
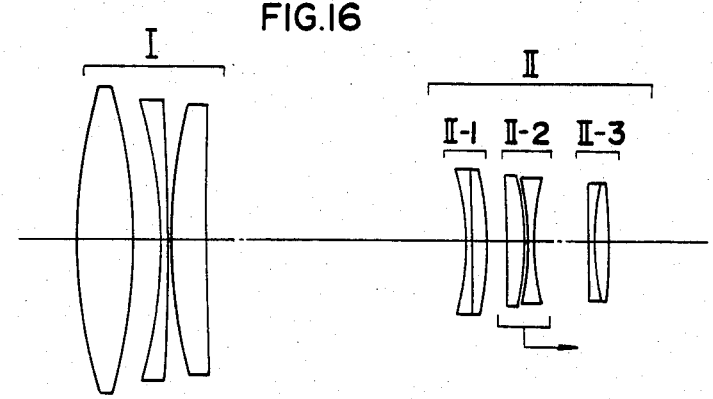
FIG. 16 shows a cross-sectional schematic view of a sixth embodiment of the present invention as Example 6.
Figure 19:
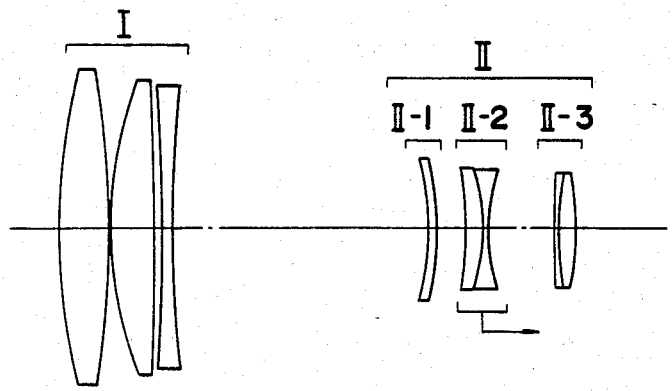
FIG. 19 is a cross-sectional schematic view showing a seventh embodiment of the lens system as Example 7.
Figure 22:
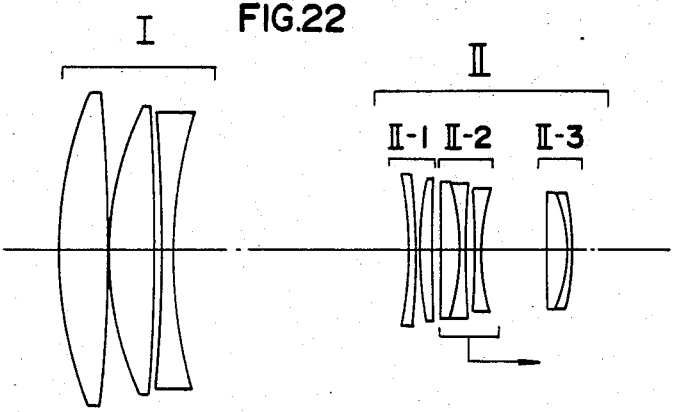
FIG. 22 is a cross-sectional schematic view showing an eighth embodiment of the lens system as Example 8.

As is apparent from FIGS. 1, 4, 7, 10, 13, 16, 19 and 22, the telephoto lens system according to the present invention comprises a front lens group (I) of a positive refractive power fixed on the optical axis, and a rear lens group (II) of a negative refractive power consisting, from the object to the image side, of a first positive subunit (II−1) fixed on the optical axis, a second negative subunit (II−2) movable along the optical axis and a third positive subunit (II−3) fixed on the optical axis, the second negative subunit (II−2) being movable toward the image side for focusing to a relatively close object. The object side end surface of the first positive subunit (II−1) of the present invention is concave.

Further, according to the present invention, the lens system fulfills the following conditions:

$$0.6 < |\phi'_{II-1}|/\phi_I < 2.5 \quad (1)$$

$$0.2f < F_{II-3} < 0.7f \quad (2)$$

$$0.3 < \phi''_{II-3}/|\phi_{II-2}| < 0.7 \quad (3)$$

$$|F_{I,II-1;II-2}| > 2.5f \quad (4)$$

$$0.4 < D/F_I < 0.7 \quad (5)$$

wherein:

$\phi'_{II-1}$ represents the refractive power of the object side end surface of the first subunit;

$\phi_I$ represents the refractive power of the front lens group;

$F_{II-3}$ represents the focal length of the third positive subunit; and f represents the focal length of the whole lens system;

$\phi''_{II-3}$ represents the refractive power of the image side end surface of the third positive subunit; and $\phi_{II-2}$ represents the refractive power of the second negative subunit;

$F_{I,II-1;II-2}$ represents the focal length of a part of the lens system defined between the front surface of the front lens group and the image side end surface of the second negative subunit upon infinity focusing;

D represents the axial distance between the front surface of the front lens group and the object side end surface of the rear lens group; and $F_I$ represents the focal length of the front lens group.

According to the present invention, the shape of the object side end surface of the first positive subunit (II−1) is effective for sufficiently correcting the negative spherical aberration caused by the front lens group (I) and for removing the flare component due to the lower ray of the off-axial pencil to realize a higher speed for the lens system. Condition (1) defines the refractive power of the object side end surface of the first positive subunit (II−1) relative to the refractive power of the front lens group (I). If the lower limit of condition (1) is violated, the correction of the negative spherical aberration caused by the front lens group (I) would be insufficient. On the other hand, if the correction is so excessive that the upper limit of condition (1) is violated, corrections of other aberrations by means of the succeeding lens components would be difficult, especially the removal of the flare component due to the lower ray of the off-axial pencil and the correction of coma.

Condition (2) relates to the paths of the rays between the second negative subunit (II−2) and the third positive subunit (II−3). Namely, a violation of the lower limit of condition (2) leads to an excessive divergence of these rays, while a violation of the upper limit of condition (2) leads to an excessive convergence of these rays. Such rays between the second and third subunits which are excessively divergent or convergent would be unfavorable to the purpose of avoiding the variation in aberrations which would be caused upon focusing by means of the movement of the second negative subunit.

Condition (3) is also to minimize the variation in aberrations and to provide a balance therebetween upon focusing by means of the movement of the second negative subunit (II—2). If the lower limit of condition (3) is violated, the correction of astigmatism and coma would be insufficient. Or, the negative spherical aberration would be increased and the variations in coma and astigmatism would be hardly avoided, if the upper limit of condition (3) is violated.

Condition (4) relates to condition (2) and is for avoiding the variation in aberrations upon focusing to a closer object. If this condition is violated, the rays between the second and third subunits would be excessively divergent or excessively convergent. In the former case of excessively divergent rays, the third positive subunit (II—3) has to be of an excessive refractive power, which would cause an unbalance between the corrections of spherical aberration and astigmatism, and also cause an increased astigmatic difference. On the other hand, in the latter case of excessively convergent rays, the third positive subunit (II—3) is inevitably of an insufficient refractive power which is incapable of minimizing the variation in aberrations, such as spherical aberration and astigmatism, caused by the movement of the second negative subunit for focusing.

Condition (5) is for realizing a telephoto lens system with high speed and compact size. Any violation of the lower limit of condition (5) would cause an increased diameter of the rear lens group (II), which results in a bulkiness of the lens system. On the other hand, if the upper limit of condition (5) is violated, any high optical performance would be hardly attained since the desired balance between the corrections of aberrations for off-axial and paraxial pencils in the rear lens group (II) would be difficult.

The above conditions (1) to (3) is more preferably further limited as follows:

$$1 < |\phi'_{II-1}|/\phi_I < 2.5 \quad (1)'$$

$$0.25f < F_{II-3} < 0.65f \quad (2)'$$

$$0.31 < \phi''_{II-3}/|\phi_{II-2}| < 0.68 \quad (3)'$$

Following Tables 1 to 8 represent eight embodiments of the present invention, respectively.

TABLE 1

[Example 1]

$f = 295.0 \quad F_{No.} = 2.9$

| | Radius of Curvature | Axial Distance | Refractive Index | Abbe Number |
|---|---|---|---|---|
| I | $r_1$ 147.089 | $d_1$ 16.000 | $N_1$ 1.49520 | $\nu_1$ 79.74 |
| | $r_2$ −627.884 | $d_2$ 0.400 | | |
| | $r_3$ 131.298 | $d_3$ 14.000 | $N_2$ 1.49520 | $\nu$ 79.74 |
| | $r_4$ −624.664 | $d_4$ 2.000 | | |
| | $r_5$ −553.063 | $d_5$ 3.500 | $N_3$ 1.74000 | $\nu_3$ 31.72 |
| | $r_6$ 308.086 | $d_6$ 79.999 | | |

TABLE 1-continued

[Example 1]

$f = 295.0 \quad F_{No.} = 2.9$

| | Radius of Curvature | Axial Distance | Refractive Index | Abbe Number |
|---|---|---|---|---|
| II 1 | $r_7$ −89.993 | $d_7$ 1.700 | $N_4$ 1.66608 | $\nu_4$ 47.95 |
| | $r_8$ −244.956 | $d_8$ 3.365 | | |
| | $r_9$ 625.692 | $d_9$ 5.500 | $N_5$ 1.51680 | $\nu_5$ 64.12 |
| | $r_{10}$ −117.957 | $d_{10}$ 6.000 | | |
| II 2 | $r_{11}$ −2515.849 | $d_{11}$ 5.500 | $N_6$ 1.70055 | $\nu_6$ 30.11 |
| | $r_{12}$ −65.332 | $d_{12}$ 1.500 | $N_7$ 1.58913 | $\nu_7$ 61.11 |
| | $r_{13}$ 377.260 | $d_{13}$ 2.000 | | |
| | $r_{14}$ −264.750 | $d_{14}$ 1.059 | $N_8$ 1.67790 | $\nu_8$ 55.38 |
| | $r_{15}$ 65.867 | $d_{15}$ 17.752 | | |
| II 3 | $r_{16}$ 370.006 | $d_{16}$ 1.600 | $N_9$ 1.64769 | $\nu_9$ 33.88 |
| | $r_{17}$ 78.943 | $d_{17}$ 6.000 | $N_{10}$ 1.60311 | $\nu_{10}$ 60.74 |
| | $r_{18}$ −90.781 | | | |

TABLE 2

[Example 2]

$f = 390.0 \quad F_{No.} = 4.0$

| | Radius of Curvature | Axial Distance | Refractive Index | Abbe Number |
|---|---|---|---|---|
| I | $r_1$ 184.455 | $d_1$ 15.001 | $N_1$ 1.49520 | $\nu_1$ 79.74 |
| | $r_2$ −393.218 | $d_2$ 0.540 | | |
| | $r_3$ 163.410 | $d_3$ 15.000 | $N_2$ 1.49520 | $\nu_2$ 79.74 |
| | $r_4$ −1234.902 | $d_4$ 3.000 | | |
| | $r_5$ −489.893 | $d_5$ 4.000 | $N_3$ 1.72100 | $\nu_3$ 33.40 |
| | $r_6$ 345.051 | $d_6$ 89.721 | | |
| II 1 | $r_7$ −104.848 | $d_7$ 2.000 | $N_4$ 1.69350 | $\nu_4$ 50.29 |
| | $r_8$ −179.807 | $d_8$ 2.051 | | |
| | $r_9$ 968.373 | $d_9$ 5.000 | $N_5$ 1.51680 | $\nu_5$ 64.12 |
| | $r_{10}$ −138.949 | $d_{10}$ 5.023 | | |
| II 2 | $r_{11}$ −1249.828 | $d_{11}$ 6.500 | $N_6$ 1.70055 | $\nu_6$ 30.11 |
| | $r_{12}$ −71.112 | $d_{12}$ 1.500 | $N_7$ 1.62041 | $\nu_7$ 60.29 |
| | $r_{13}$ 268.642 | $d_{13}$ 4.000 | | |
| | $r_{14}$ −309.437 | $d_{14}$ 2.000 | $N_8$ 1.57250 | $\nu_8$ 57.54 |
| | $r_{15}$ 90.779 | $d_{15}$ 16.119 | | |
| II 3 | $r_{16}$ 2039.775 | $d_{16}$ 2.000 | $N_9$ 1.67270 | $\nu_9$ 32.22 |
| | $r_{17}$ 98.535 | $d_{17}$ 6.500 | $N_{10}$ 1.60311 | $\nu_{10}$ 60.74 |
| | $r_{18}$ −115.864 | | | |

TABLE 3

[Example 3]
$f = 390.0$  $F_{No.} = 4.0$

| | | Radius of Curvature | Axial Distance | Refractive Index | Abbe Number |
|---|---|---|---|---|---|
| I | | $r_1$ 199.636 | $d_1$ 18.000 | $N_1$ 1.49520 | $\nu_1$ 79.74 |
| | | $r_2$ −181.665 | $d_2$ 8.373 | | |
| | | $r_3$ −164.923 | $d_3$ 3.000 | $N_2$ 1.74000 | $\nu_3$ 31.72 |
| | | $r_4$ −531.909 | $d_4$ 0.884 | | |
| | | $r_5$ 180.628 | $d_5$ 12.000 | $N_3$ 1.49520 | $\nu_3$ 79.74 |
| | | $r_6$ 1824.417 | $d_6$ 89.975 | | |
| II | 1 | $r_7$ −82.698 | $d_7$ 3.507 | $N_4$ 1.62041 | $\nu_4$ 60.29 |
| | | $r_8$ −82.717 | $d_8$ 12.000 | | |
| | 2 | $r_9$ 1030.014 | $d_9$ 6.712 | $N_5$ 1.71736 | $\nu_5$ 29.42 |
| | | $r_{10}$ −69.228 | $d_{10}$ 1.568 | $N_6$ 1.61762 | $\nu_6$ 52.70 |
| | | $r_{11}$ 281.867 | $d_{11}$ 4.858 | | |
| | | $r_{12}$ −496.327 | $d_{12}$ 1.971 | $N_7$ 1.67790 | $\nu_7$ 55.38 |
| | | $r_{13}$ 78.661 | $d_{13}$ 19.000 | | |
| | 3 | $r_{14}$ 216.109 | $d_{14}$ 2.004 | $N_8$ 1.66446 | $\nu_8$ 35.84 |
| | | $r_{15}$ 57.186 | $d_{15}$ 5.500 | $N_9$ 1.58913 | $\nu_9$ 61.11 |
| | | $r_{16}$ −184.928 | | | |

TABLE 4

[Example 4]
$f = 295.0$  $F_{No.} = 2.9$

| | | Radius of Curvature | Axial Distance | Refractive Index | Abbe Number |
|---|---|---|---|---|---|
| I | | $r_1$ 201.906 | $d_1$ 16.000 | $N_1$ 1.49520 | $\nu_1$ 79.74 |
| | | $r_2$ −322.669 | $d_2$ 0.400 | | |
| | | $r_3$ 127.067 | $d_3$ 14.000 | $N_2$ 1.49520 | $\nu_2$ 79.74 |
| | | $r_4$ −1580.651 | $d_4$ 3.000 | | |
| | | $r_5$ −513.431 | $d_5$ 3.500 | $N_3$ 1.74000 | $\nu_3$ 31.72 |
| | | $r_6$ 332.886 | $d_6$ 85.000 | | |
| II | 1 | $r_7$ −96.545 | $d_7$ 3.000 | $N_4$ 1.58913 | $\nu_4$ 61.11 |
| | | $r_8$ −93.081 | $d_8$ 9.863 | | |
| | 2 | $r_9$ −466.381 | $d_9$ 5.500 | $N_5$ 1.70055 | $\nu_5$ 30.11 |
| | | $r_{10}$ −72.443 | $d_{10}$ 1.500 | $N_6$ 1.58913 | $\nu_6$ 61.11 |
| | | $r_{11}$ 385.918 | $d_{11}$ 2.000 | | |
| | | $r_{12}$ −341.056 | $d_{12}$ 1.059 | $N_7$ 1.67790 | $\nu_7$ 55.38 |
| | | $r_{13}$ 72.024 | $d_{13}$ 19.000 | | |
| | 3 | $r_{14}$ 171.815 | $d_{14}$ 1.600 | $N_8$ 1.64769 | $\nu_8$ 33.88 |
| | | $r_{15}$ 67.098 | $d_{15}$ 6.600 | $N_9$ 1.60311 | $\nu_9$ 60.74 |
| | | $r_{16}$ −102.033 | | | |

TABLE 5

[Example 5]
$f = 390.0$  $F_{No.} = 4.0$

| | | Radius of Curvature | Axial Distance | Refractive Index | Abbe Number |
|---|---|---|---|---|---|
| I | | $r_1$ 171.454 | $d_1$ 15.001 | $N_1$ 1.49520 | $\nu_1$ 79.74 |
| | | $r_2$ −455.064 | $d_2$ 0.540 | | |
| | | $r_3$ 137.385 | $d_3$ 15.000 | $N_2$ 1.49520 | $\nu_2$ 79.74 |
| | | $r_4$ −1415.648 | $d_4$ 3.000 | | |
| | | $r_5$ −662.111 | $d_5$ 4.000 | $N_3$ 1.72100 | $\nu_3$ 33.40 |
| | | $r_6$ 272.436 | $d_6$ 89.721 | | |
| II | 1 | $r_7$ −103.908 | $d_7$ 2.000 | $N_4$ 1.69350 | $\nu_4$ 50.29 |
| | | $r_8$ −200.975 | $d_8$ 2.051 | | |
| | | $r_9$ −2014.300 | $d_9$ 5.000 | $N_5$ 1.51680 | $\nu_5$ 64.12 |
| | | $r_{10}$ −127.895 | $d_{10}$ 9.023 | | |
| | 2 | $r_{11}$ −220.810 | $d_{11}$ 6.000 | $N_6$ 1.75570 | $\nu_6$ 27.21 |
| | | $r_{12}$ −61.966 | $d_{12}$ 2.000 | $N_7$ 1.61762 | $\nu_7$ 52.70 |
| | | $r_{13}$ 70.849 | $d_{13}$ 16.119 | | |
| | 3 | $r_{14}$ ∞ | $d_{14}$ 2.000 | $N_8$ 1.67270 | $\nu_8$ 32.22 |
| | | $r_{15}$ 167.291 | $d_{15}$ 6.500 | $N_9$ 1.60311 | $\nu_9$ 60.74 |
| | | $r_{16}$ −122.822 | | | |

TABLE 6

[Example 6]
$f = 390.0$  $F_{No.} = 4.0$

| | | Radius of Curvature | Axial Distance | Refractive Index | Abbe Number |
|---|---|---|---|---|---|
| I | | $r_1$ 169.271 | $d_1$ 18.00 | $N_1$ 1.49520 | $\nu_1$ 79.74 |
| | | $r_2$ −200.424 | $d_2$ 9.121 | | |
| | | $r_3$ −179.715 | $d_3$ 3.000 | $N_2$ 1.74000 | $\nu_2$ 31.72 |
| | | $r_4$ −818.605 | $d_4$ 0.934 | | |
| | | $r_5$ 183.561 | $d_5$ 12.000 | $N_3$ 1.49520 | $\nu_3$ 79.74 |
| | | $r_6$ 2531.516 | $d_6$ 85.426 | | |
| II | 1 | $r_7$ −90.711 | $d_7$ 2.054 | $N_4$ 1.58913 | $\nu_4$ 61.11 |
| | | $r_8$ −1286.106 | $d_8$ 5.000 | $N_5$ 1.66998 | $\nu_5$ 39.23 |
| | | $r_9$ −101.918 | $d_9$ 6.706 | | |
| | 2 | $r_{10}$ −401.027 | $d_{10}$ 5.622 | $N_6$ 1.75570 | $\nu_6$ 27.21 |
| | | $r_{11}$ −112.549 | $d_{11}$ 1.000 | | |
| | | $r_{12}$ −124.334 | $d_{12}$ 2.200 | $N_7$ 1.71300 | $\nu_7$ 53.93 |
| | | $r_{13}$ 87.908 | $d_{13}$ 18.013 | | |
| | 3 | $r_{14}$ 883.657 | $d_{14}$ 2.004 | $N_8$ 1.66446 | $\nu_8$ 35.84 |
| | | $r_{15}$ 97.369 | $d_{15}$ 5.500 | $N_9$ 1.58913 | $\nu_9$ 61.11 |
| | | $r_{16}$ −137.676 | | | |

TABLE 7

[Example 7]

f = 295.0  $F_{No.}$ = 2.9

| | | Radius of Curvature | | Axial Distance | | Refractive Index | | Abbe Number |
|---|---|---|---|---|---|---|---|---|
| I | $r_1$ | 222.194 | $d_1$ | 16.000 | $N_1$ | 1.49520 | $\nu_1$ | 79.74 |
| | $r_2$ | −320.887 | $d_2$ | 0.400 | | | | |
| | $r_3$ | 128.803 | $d_3$ | 14.000 | $N_2$ | 1.49520 | $\nu_2$ | 79.74 |
| | $r_4$ | −2696.071 | $d_4$ | 3.000 | | | | |
| | $r_5$ | −578.325 | $d_5$ | 3.500 | $N_3$ | 1.75690 | $\nu_3$ | 29.69 |
| | $r_6$ | 460.984 | $d_6$ | 85.000 | | | | |
| II 1 | $r_7$ | −95.481 | $d_7$ | 3.000 | $N_4$ | 1.58913 | $\nu_4$ | 61.11 |
| | $r_8$ | −92.114 | $d_8$ | 9.865 | | | | |
| II 2 | $r_9$ | −130.493 | $d_9$ | 5.500 | $N_5$ | 1.75570 | $\nu_5$ | 27.21 |
| | $r_{10}$ | −56.477 | $d_{10}$ | 1.500 | $N_6$ | 1.62374 | $\nu_6$ | 47.07 |
| | $r_{11}$ | 66.441 | $d_{11}$ | 22.000 | | | | |
| II 3 | $r_{12}$ | 428.730 | $d_{12}$ | 1.600 | $N_7$ | 1.65100 | $\nu_7$ | 39.55 |
| | $r_{13}$ | 102.264 | $d_{13}$ | 6.000 | $N_8$ | 1.60311 | $\nu_8$ | 60.74 |
| | $r_{14}$ | −80.683 | | | | | | |

TABLE 8

[Example 8]

f = 295.0  $F_{No.}$ = 2.9

| | | Radius of Curvature | | Axial Distance | | Refractive Index | | Abbe Number |
|---|---|---|---|---|---|---|---|---|
| I | $r_1$ | 140.872 | $d_1$ | 16.00 | $N_1$ | 1.49520 | $\nu_1$ | 79.74 |
| | $r_2$ | −447.513 | $d_2$ | 0.42 | | | | |
| | $r_3$ | 115.956 | $d_3$ | 14.50 | $N_2$ | 1.49520 | $\nu_2$ | 79.74 |
| | $r_4$ | −701.292 | $d_4$ | 2.52 | | | | |
| | $r_5$ | −474.476 | $d_5$ | 3.70 | $N_3$ | 1.68150 | $\nu_3$ | 36.64 |
| | $r_6$ | 170.954 | $d_6$ | 78.00 | | | | |
| II 1 | $r_7$ | −131.706 | $d_7$ | 2.50 | $N_4$ | 1.65446 | $\nu_4$ | 33.86 |
| | $r_8$ | −216.400 | $d_8$ | 1.35 | | | | |
| | $r_9$ | 111.332 | $d_9$ | 4.00 | $N_5$ | 1.60311 | $\nu_5$ | 60.74 |
| | $r_{10}$ | 508.815 | $d_{10}$ | 3.00 | | | | |
| II 2 | $r_{11}$ | −1256.8 | $d_{11}$ | 6.50 | $N_6$ | 1.71736 | $\nu_6$ | 29.42 |
| | $r_{12}$ | −65.525 | $d_{12}$ | 1.85 | $N_7$ | 1.60311 | $\nu_7$ | 60.74 |
| | $r_{13}$ | 366.046 | $d_{13}$ | 3.15 | | | | |
| | $r_{14}$ | −228.633 | $d_{14}$ | 1.70 | $N_8$ | 1.67000 | $\nu_8$ | 57.07 |
| | $r_{15}$ | 66.759 | $d_{15}$ | 22.00 | | | | |
| II 3 | $r_{16}$ | 1084.8 | $d_{16}$ | 7.00 | $N_9$ | 1.60311 | $\nu_9$ | 60.74 |
| | $r_{17}$ | −42.017 | $d_{17}$ | 1.60 | $N_{10}$ | 1.65446 | $\nu_{10}$ | 33.86 |
| | $r_{18}$ | −79.965 | | | | | | |

TABLE 9

| Example | Movement (mm) | Object Distance (m) |
|---|---|---|
| 1 | 14.034 | 3 |
| 2 | 11.131 | 4.5 |
| 3 | 12.744 | 4.5 |
| 4 | 16.402 | 3 |
| 5 | 11.824 | 4.5 |
| 6 | 12.297 | 4.5 |
| 7 | 14.998 | 3 |
| 8 | 11.760 | 3 |

Figure 2A:
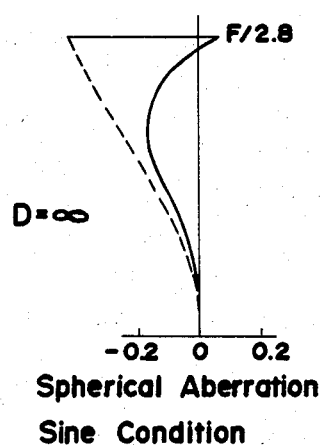
FIGS. 2a, 2b and 2c disclose respectively the spherical aberration, astigmatism and distortion when the first embodiment is focused at infinity.
Figure 2B:
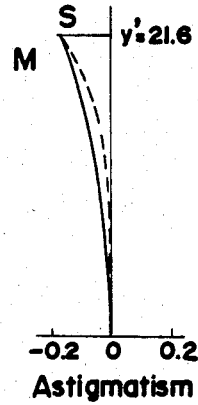
Figure 2C:
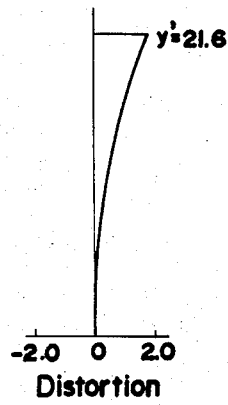
Figure 3A:
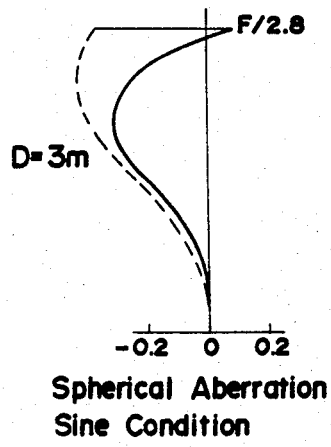
FIGS. 3a, 3b and 3c disclose respectively the spherical aberration, astigmatism and distortion when the first embodiment is focused at a distance, 3 m.
Figure 3B:
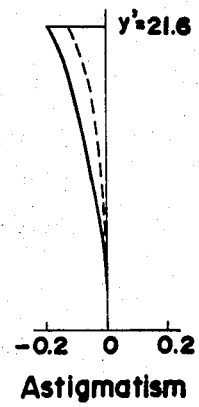
Figure 3C:
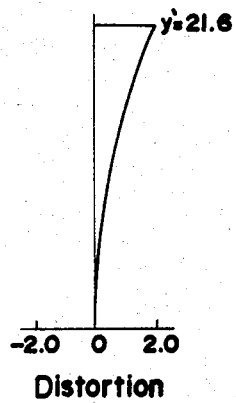
Figure 5A:
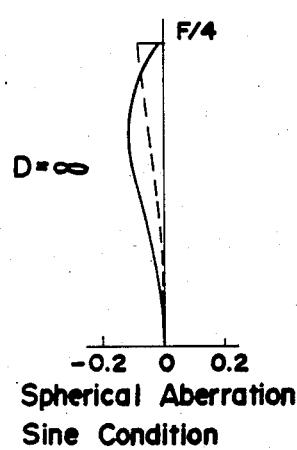
FIGS. 5a, 5b and 5c disclose respectively the spherical aberration, astigmatism and distortion when the second embodiment is focused at infinity.
Figure 5B:
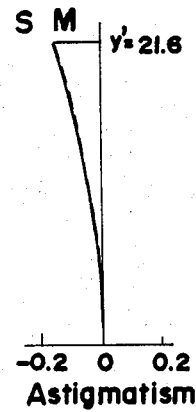
Figure 5C:
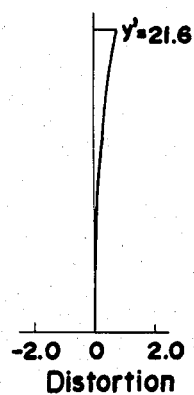
Figure 6A:
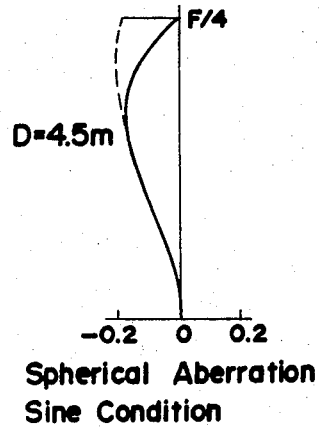
FIGS. 6a, 6b and 6c disclose respectively the spherical aberration, astigmatism and distortion when the second embodiment is focused at a distance, 4.5 m.
Figure 6B:
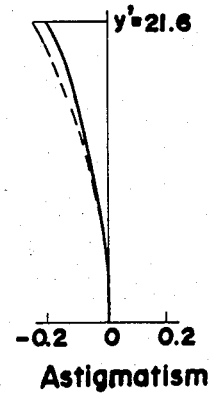
Figure 6C:
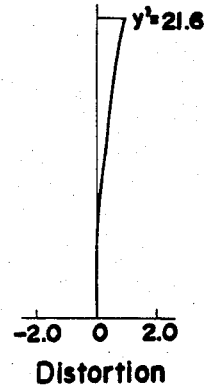
Figure 11A:
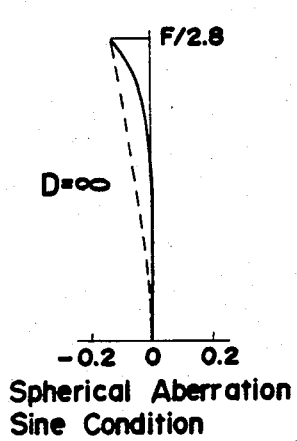
FIGS. 11a, 11b and 11c disclose respectively the spherical aberration, astigmatism and distortion when the fourth embodiment is focused at infinity.
Figure 11B:
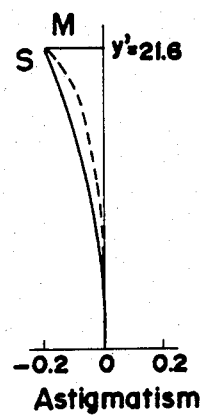
Figure 11C:
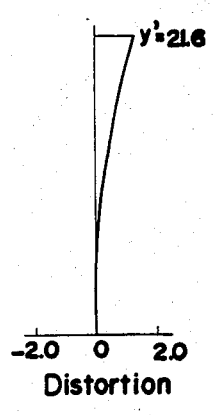
Figure 12A:
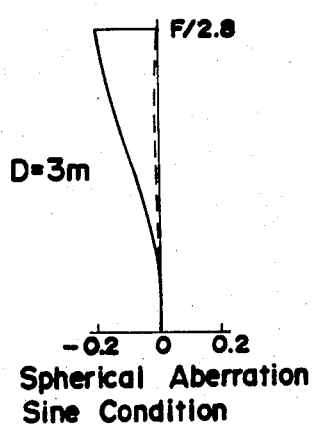
FIGS. 12a, 12b and 12c disclose respectively the spherical aberration, astigmatism and distortion when the fourth embodiment is focused at a distance, 3 m.
Figure 12B:
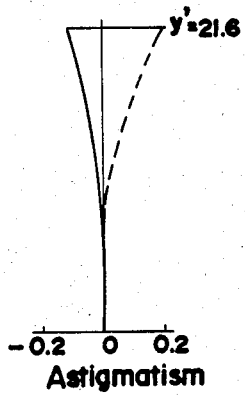
Figure 12C:
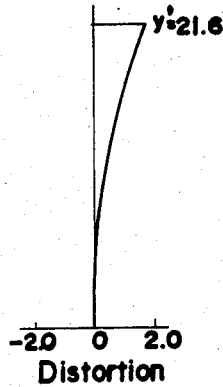
Figure 14A:
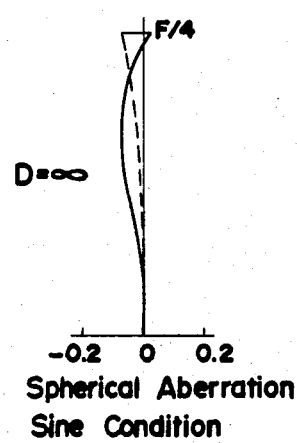
FIGS. 14a, 14b and 14c disclose respectively the spherical aberration, astigmatism and distortion when the fifth embodiment is focused at infinity.
Figure 14B:
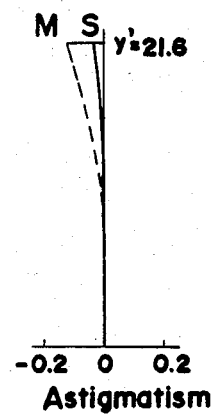
Figure 14C:
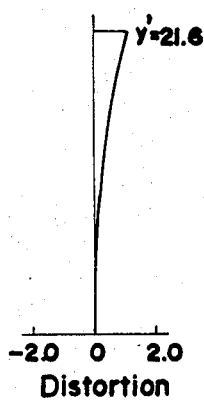
Figure 15A:
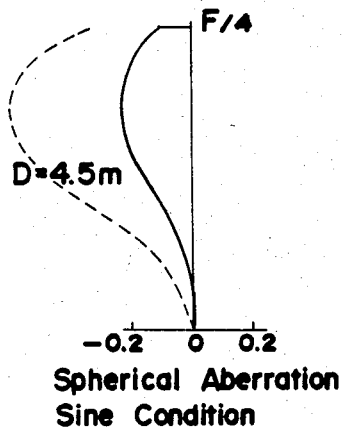
FIGS. 15a, 15b and 15c disclose respectively the spherical aberration, astigmatism and distortion when the fifth embodiment is focused at a distance, 4.5 m.
Figure 15B:
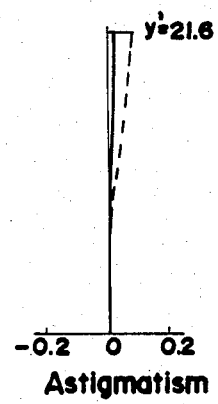
Figure 15C:
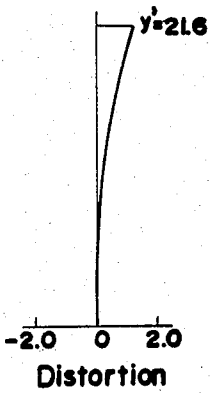
Figure 17A:
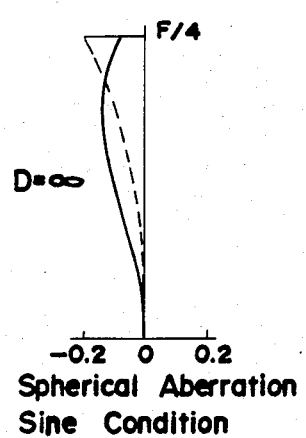
FIGS. 17a, 17b and 17c show respectively the spherical aberration, astigmatism and distortion when the sixth embodiment is focused at infinity.
Figure 17B:
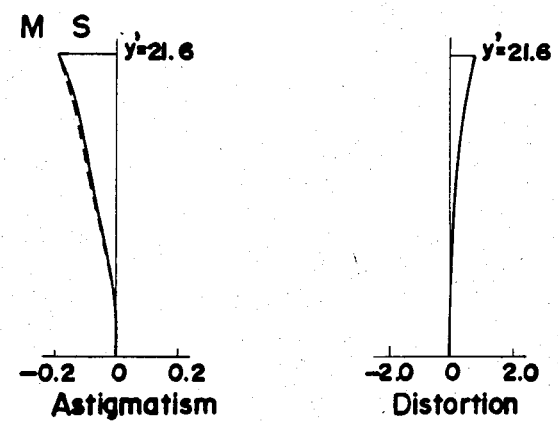
Figure 17C:
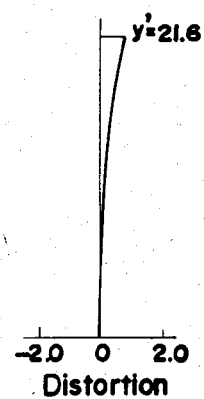
Figure 18A:
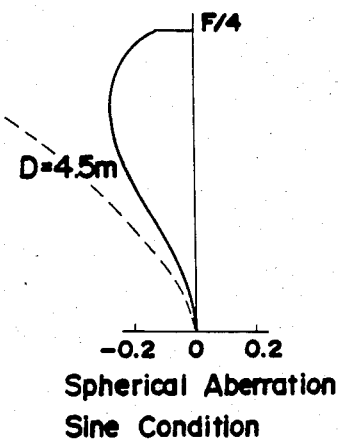
FIGS. 18a, 18b and 18c disclose respectively the spherical aberration, astigmatism and distortion when the sixth embodiment is focused at a distance, 4.5 m.
Figure 18B:
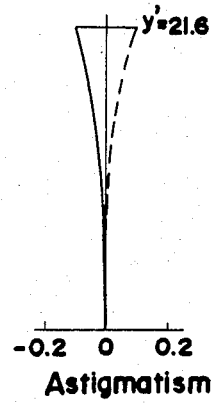
Figure 18C:
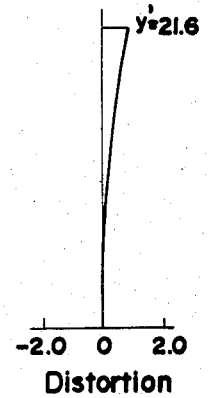
Figure 20A:
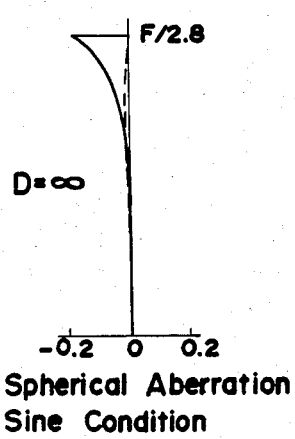
FIGS. 20a, 20b and 20c show respectively the spherical aberration, astigmatism and distortion when the seventh embodiment is focused at infinity.
Figure 20B:
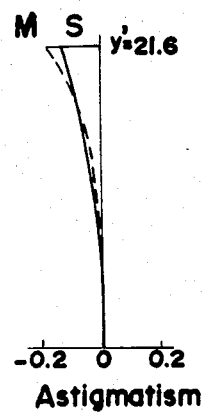
Figure 20C:
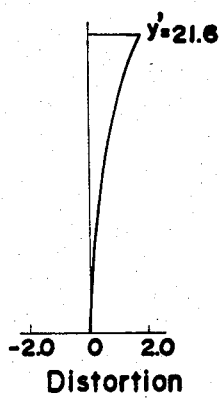
Figure 21A:
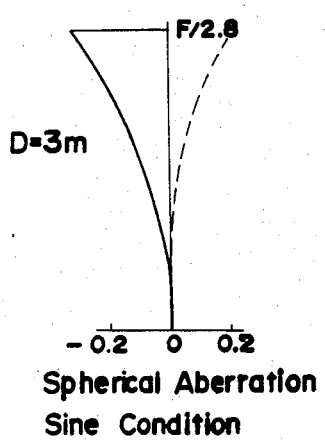
FIGS. 21a, 21b and 21c disclose respectively the spherical aberration, astigmatism and distortion when the seventh embodiment is focused at a distance, 3 m.
Figure 21B:
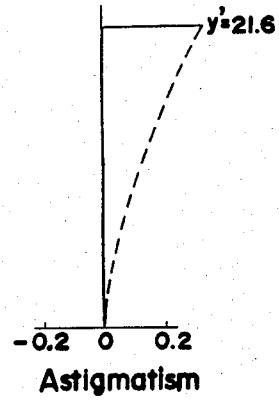
Figure 21C:
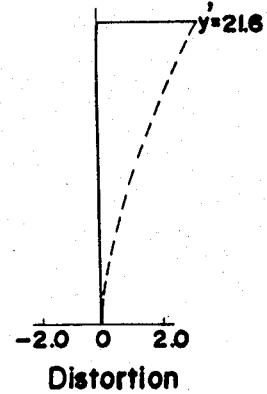
Figure 23A:
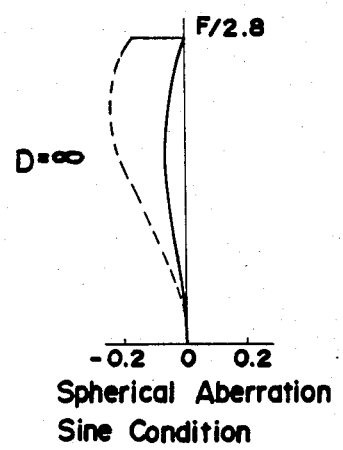
FIGS. 23a, 23b and 23c show respectively the spherical aberration, astigmatism and distortion when the eighth embodiment is focused at infinity, and FIGS. 24a, 24b and 24c disclose respectively the spherical aberration, astigmatism and distortion when the eighth embodiment is focused at a distance, 3 m.
Figure 23B:
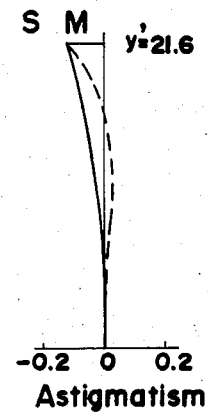
Figure 23C:
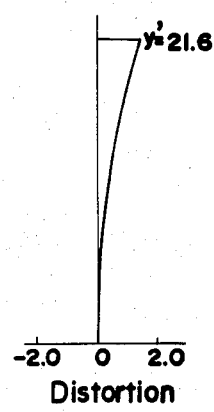
Figure 24A:
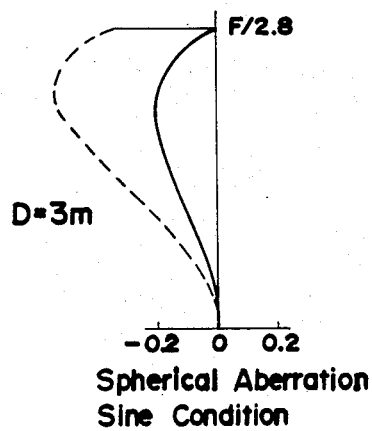
Figure 24B:
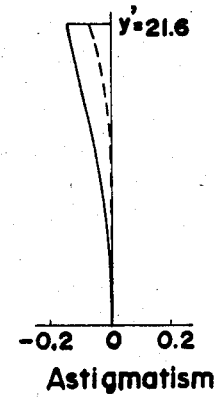
Figure 24C:
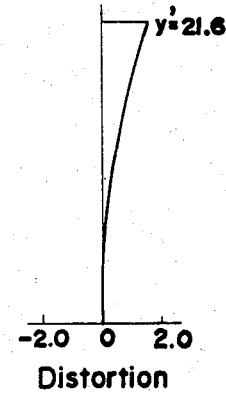

FIGS. 1, 4, 7, 10, 13, 16, 19 and 22 represent cross sectional views of the above first to eighth embodiments as Example 1 to Example 8, respectively. FIGS. 2, 5, 8, 11, 14, 17, 20 and 23 represent aberrations of these embodiments upon infinity focusing, respectively. And, FIGS. 3, 6, 9, 12, 15, 18, 21 and 24 represent aberrations of these embodiments upon close focusing by means of moving the second negative subunit (II−2) toward the image side by the values summarized in Table 9 to focus the lens system at the object distances also summarized in Table 9, respectively.

The first, second and eighth embodiments are of substantially similar shape. However, the first and eighth embodiments relate to a high speed telephoto lens system of a class of f=300 mm, Fno.=2.8, while the second embodiment relates to a telephoto lens system of a class of f=400 mm, Fno.=4. In these embodiments, the front lens group (I) consists of a first positive element, a second positive element and a third negative element, and the rear lens group (II) has a first positive subunit (II−1) consisting of a negative meniscus lens element concave to the object side and a positive lens element, a second negative subunit (II−2) consisting of a doublet and a negative lens element with a strongly concave image side surface, and a third positive subunit consisting of a doublet.

The third and fourth embodiments show examples of the first positive subgroup (II−1) consisting of only a positive meniscus lens element concave to the object side. Further, the front lens group (I) of the third embodiment is of a type consisting of a first positive element, second negative element and a third positive element.

The fifth to seventh embodiments are for showing variations of the rear lens group (II). Namely, the fifth embodiment is of a type in which the second negative subunit (II−2) consists of a biconcave doublet. The sixth embodiment discloses a first positive subunit (II−1) consisting of a doublet concave to the object side, and a second negative subunit (II−2) consisting of a pair of separate positive and negative elements. And, the seventh embodiment is of the simplest construction in which the first positive subunit (II−1) consists of a single positive meniscus lens element and the second negative subunit (II−2) consists of only a biconcave doublet.

Other variations may be of course possible. For example, the third positive subunit (II−3) can be constructed by only one positive single lens element, although the correction of chromatic aberration will be somewhat unsatisfactory. Such a modification can, however, be sufficiently practical in a lens system with a relatively slow speed and an increased depth of focus.

As can be readily appreciated, it is possible to deviate from the above embodiments of the present invention and as will be readily understood by those skilled in the art the present invention is capable of many modifications and improvements within the scope and spirit thereof. Accordingly, it will be understood that the invention is not to be limited by the specific disclosed embodiments but should be measured solely from the following claims, in which I claim.

What is claimed is:

1. A telephoto lens system comprising:
a front lens group of a positive refractive power fixed on the optical axis; and
a rear lens group of a negative refractive power consisting, from the object to the image side, of a first positive subunit fixed on the optical axis, a second negative subunit movable along the optical axis and a third positive subunit fixed on the optical axis, the second negative subunit being movable toward the image side for focusing to a close object.

2. The invention of claim 1, wherein the object side end surface of the first positive subunit is concave.

3. The invention of claim 2, wherein the lens system fulfills the following condition:

$$0.6 < |\phi'_{II-1}|/\phi_I < 2.5$$

wherein:
$\phi'_{II-1}$ represents the refractive power of the object side end surface of the first subunit; and
$\phi_I$ represents the refractive power of the front lens group.

4. The invention of claim 3, wherein the lens system further fulfills the following condition:

$$0.2f < F_{II-3} < 0.7f$$

wherein:
$F_{II-3}$ represents the focal length of the third positive subunit; and
f represents the focal length of the whole lens system.

5. The invention of claim 4, wherein the range for $F_{II-3}$ is as follows:

$$0.25f < F_{II-3} < 0.65f.$$

6. The invention of claim 5, wherein the lens system further fulfills the following condition:

$$0.3 < \phi''_{II-3}/|\phi_{II-2}| < 0.7$$

wherein:
$\phi''_{II-3}$ represents the refractive power of the image side end surface of the third positive subunit; and
$\phi_{II-2}$ represents the refractive power of the second negative subunit.

7. The invention of claim 6, wherein the range for $\phi''_{II-3}/|\phi_{II-2}|$ is as follows:

$$0.31 < \phi''_{II-3}/|\phi_{II-2}| < 0.68.$$

8. The invention of claim 7, wherein the lens system further fulfills the following conditions:

$$|F_{I;II-1;II-2}| > 2.5 f$$

$$0.4 < D/F_I < 0.7$$

wherein:
$F_{I;II-1;II-2}$ represents the focal length of a part of the lens system defined between the front surface of the front lens group and the image side end surface of the second negative subunit upon infinity focusing;
D represents the axial distance between the front surface of the front lens group and the object side end surface of the rear lens group; and
$F_I$ represents the focal length of the front lens group.

9. The invention of claim 1, wherein the lens system fulfills the following condition:

$$0.25f < F_{II-3} < 0.65f$$

wherein:
$F_{II-3}$ represents the focal length of the third positive subunit; and
f represents the focal length of the whole lens system.

10. The invention of claim 9, wherein the lens system further fulfills the following condition:

$$0.31 < \phi''_{II-3}/|\phi_{II-2}| < 0.68$$

wherein:
$\phi''_{II-3}$ represents the refractive power of the image side end surface of the third positive subunit; and
$\phi_{II-2}$ represents the refractive power of the second negative subunit.

11. A telephoto lens system comprising:
a front lens group of a positive refractive power fixed on the optical axis; and
a rear lens group of a negative refractive power consisting of, from the object to the image side, a first fixed subunit, a second movable subunit and a third fixed subunit, the second subgroup being movable toward the image side for focusing to a close object,
wherein the lens system fulfills the following condition:

$$0.25f < F_{II-3} < 0.65f$$

wherein
$F_{II-3}$ represents the focal length of the third fixed subunit; and
f represents the focal length of the whole lens system.

12. The invention of claim 11, wherein the lens system further fulfills the following condition:

$$0.31 < \phi''_{II-3}/|\phi_{II-2}| < 0.68$$

wherein:
$\phi''_{II-3}$ represents the refractive power of the image side end surface of the third fixed subunit; and
$\phi_{II-2}$ represents the refractive power of the second movable subunit.

13. The invention of claim 12, wherein the first subunit consists of a negative meniscus lens element concave to the object side and a positive lens element.

14. The invention of claim 12, wherein the first subunit consists of a positive meniscus lens element concave to the object side.

15. The invention of claim 12, wherein the first subunit consists of a positive meniscus doublet concave to the object side.

16. A telephoto lens system comprising:
a front lens group of a positive refractive power;
a rear lens group of a negative refractive power consisting, from the object to the image side, of a first subunit having a concave object side end surface, a second subunit and a third subunit,
wherein the lens system fulfills the following condition:

$$0.6<|\phi'_{II-1}|/\phi_I<2.5$$

wherein:
$\phi'_{II-1}$ represents the refractive power of the object side end surface of the first subunit; and
$\phi_I$ represents the refractive power of the front lens group.

17. The invention of claim 16, wherein the lens system further fulfills the following condition:

$$0.25f<F_{II-3}<0.65f$$

wherein:
$F_{II-3}$ represents the focal length of the third subunit; and
f represents the focal length of the whole lens system.

18. The invention of claim 17, wherein the lens system further fulfills the following condition:

$$0.31<\phi''_{II-3}/|\phi_{II-2}|<0.68$$

wherein:
$\phi''_{II-3}$ represents the refractive power of the image side end surface of the third subunit; and
$\phi_{II-2}$ represents the refractive power of the second subunit.

19. The invention of claim 18, wherein the lens system further fulfills the following conditions:

$$|F_{I;II-1;II-2}|>2.5f$$

$$0.4<D/F_I<0.7$$

wherein:
$F_{I;II-1;II-2}$ represents the focal length of a part of the lens system defined between the front surface of the front lens group and the image side end surface of the second subunit upon infinity focusing;
D represents the axial distance between the front surface of the front lens group and the object side end surface of the rear lens group; and
$F_I$ represents the focal length of the front lens group.

20. A telephoto lens system according to the following parameters:

| | | f = 295.0 | | $F_{No.}$ = 2.9 | | | |
|---|---|---|---|---|---|---|---|
| | | Radius of Curvature | Axial Distance | | Refractive Index | | Abbe Number |
| I | $r_1$ | 140.872 | | | | | |
| | | | $d_1$ | 16.00 | $N_1$ | 1.49520 | $v_1$ 79.74 |
| | $r_2$ | −447.513 | | | | | |
| | | | $d_2$ | 0.42 | | | |
| | $r_3$ | 115.956 | | | | | |
| | | | $d_3$ | 14.50 | $N_2$ | 1.49520 | $v_2$ 79.74 |
| | $r_4$ | −701.292 | | | | | |
| | | | $d_4$ | 2.52 | | | |
| | $r_5$ | −474.476 | | | | | |
| | | | $d_5$ | 3.70 | $N_3$ | 1.68150 | $v_3$ 36.64 |
| | $r_6$ | 170.954 | | | | | |
| | | | $d_6$ | 78.00 | | | |
| II 1 | $r_7$ | −131.706 | | | | | |
| | | | $d_7$ | 2.50 | $N_4$ | 1.65446 | $v_4$ 33.86 |
| | $r_8$ | −216.400 | | | | | |
| | | | $d_8$ | 1.35 | | | |
| | $r_9$ | 111.332 | | | | | |
| | | | $d_9$ | 4.00 | $N_5$ | 1.60311 | $v_5$ 60.74 |
| | $r_{10}$ | 508.815 | | | | | |
| | | | $d_{10}$ | 3.00 | | | |
| 2 | $r_{11}$ | −1256.8 | | | | | |
| | | | $d_{11}$ | 6.50 | $N_6$ | 1.71736 | $v_6$ 29.42 |
| | $r_{12}$ | −65.525 | | | | | |
| | | | $d_{12}$ | 1.85 | $N_7$ | 1.60311 | $v_7$ 60.74 |
| | $r_{13}$ | 366.046 | | | | | |
| | | | $d_{13}$ | 3.15 | | | |
| | $r_{14}$ | −228.633 | | | | | |
| | | | $d_{14}$ | 1.70 | $N_8$ | 1.67000 | $v_8$ 57.07 |
| | $r_{15}$ | 66.759 | | | | | |
| | | | $d_{15}$ | 22.00 | | | |
| 3 | $r_{16}$ | 1084.8 | | | | | |
| | | | $d_{16}$ | 7.00 | $N_9$ | 1.60311 | $v_9$ 60.74 |
| | $r_{17}$ | −42.017 | | | | | |
| | | | $d_{17}$ | 1.60 | $N_{10}$ | 1.65446 | $v_{10}$ 33.86 |
| | $r_{18}$ | −79.965. | | | | | |

* * * * *